United States Patent [19]

Breed

[11] Patent Number: 5,684,701

[45] Date of Patent: Nov. 4, 1997

[54] METHOD AND APPARATUS FOR SENSING A VEHICLE CRASH

[75] Inventor: David S. Breed, Boonton Township, N.J.

[73] Assignee: Automotive Technologies International, Inc., Denville, N.J.

[21] Appl. No.: 476,076

[22] Filed: Jun. 7, 1995

[51] Int. Cl.$^6$ ....................................... B60R 21/32
[52] U.S. Cl. ............................. 364/424.055; 340/669; 307/10.1; 280/735; 180/282
[58] Field of Search .................. 364/424.25; 340/436, 340/669; 307/10.1; 280/734, 735; 180/282, 274

[56] References Cited

U.S. PATENT DOCUMENTS

| | | | |
|---|---|---|---|
| 4,257,703 | 3/1981 | Goodrich | 340/436 |
| 5,157,268 | 10/1992 | Spies et al. | 307/10.1 |
| 5,173,614 | 12/1992 | Woehrl et al. | 307/10.1 |
| 5,232,243 | 8/1993 | Blackburn et al. | 280/735 |
| 5,282,134 | 1/1994 | Gioutsos et al. | 364/424.05 |
| 5,330,226 | 7/1994 | Gentry et al. | 280/735 |
| 5,366,241 | 11/1994 | Kithil | 280/735 |
| 5,377,108 | 12/1994 | Nishio | 364/424.05 |
| 5,377,201 | 12/1994 | Chakradheur et al. | 371/23 |
| 5,418,722 | 5/1995 | Cashler | 364/424.05 |
| 5,449,198 | 9/1995 | Jeenicke et al. | 280/735 |
| 5,454,591 | 10/1995 | Mazur et al. | 280/735 |
| 5,461,566 | 10/1995 | Musser | 364/424.05 |
| 5,461,567 | 10/1995 | Kelley et al. | 364/424.05 |
| 5,474,327 | 12/1995 | Schousek | 280/735 |
| 5,508,920 | 4/1996 | Gioutsos et al. | 364/424.05 |
| 5,528,698 | 6/1996 | Kamei et al. | 280/735 |
| 5,541,590 | 7/1996 | Nishio | 364/424.04 |
| 5,541,842 | 7/1996 | Gioutsos et al. | 364/424.05 |
| 5,559,699 | 9/1996 | Gioutsos | 364/424.05 |

OTHER PUBLICATIONS

"Using a Neural Network to Distinguish Between Deployment Events and Non-Deployment Events in a Supplemental Inflatable Restraint System", Dr. Stephen J. Kiselewich and Douglas D. Turner, Delco Electronics Corporation, Automotive Electronics 95, A review of technical achievements at Delco Electronics, pp. 5–10, 1995.

D.S. Breed and V. Castelli, "Problems in Design and Engineering of Air Bag Systems", SAE Technical Paper Series 880724, Feb. 29, 1988 –Mar. 4, 1988.

D.S. Breed and V. Castelli, "Trends in Sensing Frontal Impacts", SAE Technical Paper Series, No. 890750, Feb.27, 1989 –Mar. 3, 1989.

D.S. Breed and V. Castelli, "A Critique of Single Point Sensing", SAE Technical Paper Series, No. 920124, 1992.

D. Breed, W.T. Sanders, V. Castelli, "A Complete Frontal Crash Sensor System–1", SAE Technical Paper Series No. 930650, Mar. 1–5, 1993, 1993.

D.S. Breed, W.T. Sanders, "Using Vehicle Deformation to Sense Crashes", Presented at the International Body Engineering COnf. Sep. 21–23, 1993.

D.S. Breed, W.T. Sanders, V. Castelli, "A Complete Frontal Crash Sensor System–II", Proceedings at the Enhanced Safety of Vehicles Conf., Munich, Germany 1994, Published by the US Dept. of Transportation, NHTSA, Washington, D.C.

*Primary Examiner*—Kevin J. Teska
*Assistant Examiner*—Tyrone V. Walker

[57] ABSTRACT

A sensor system for initiating deployment of an occupant protection apparatus in a motor vehicle, such as an airbag, to protect an occupant of the vehicle in a crash. The system includes a sensor mounted to the vehicle for sensing accelerations of the vehicle and producing an analog signal representative thereof; an electronic converter for receiving the analog signal from the sensor and for converting the analog signal into a digital signal, and a processor which receives the digital signal. The processor includes a pattern recognition system and produces a deployment signal when the pattern recognition system determines that the digital signal contains a pattern characteristic of a vehicle crash requiring occupant protection. A deployment initiation mechanism is coupled to the processor and, responsive to the deployment signal, initiates deployment of the occupant protection apparatus.

24 Claims, 9 Drawing Sheets

NEURAL NETWORK SINGLE POINT, PASSENGER COMPARTMENT MOUNTED SENSOR PERFORMANCE

| SCALED VELOCITY | \multicolumn{6}{c}{BARRIER SCALING FACTOR} | | | | | |
|---|---|---|---|---|---|---|
| | 1 | 1.2 | 1.4 | 1.6 | 1.8 | 2 |
| 8 MPH | NT | NT | NT | NT | NT | NT |
| 10 MPH | NT | 0.7/2.9 | 0.9/3.1 | 1.0/3.0 | NT | NT |
| 12 MPH | 0.0/1.1 | 0.8/3.5 | 0.9/3.5 | 1.0/3.4 | 1.4/3.9 | 2.0/4.7 |
| 14 MPH | 0.0/1.2 | 0.8/4.1 | 1.0/3.8 | 1.2/4.0 | 1.3/4.0 | 1.7/4.5 |
| 16 MPH | 0.0/1.4 | 0.9/4.4 | 1.0/4.0 | 1.1/4.0 | 1.4/4.3 | 1.7/4.6 |
| 18 MPH | 0.0/1.6 | 0.8/4.2 | 0.7/3.6 | 1.2/4.5 | 1.6/4.8 | 1.8/4.9 |
| 20 MPH | 0.0/1.8 | 0.7/4.3 | 0.7/4.0 | 1.1/4.3 | 1.3/4.4 | 1.0/3.8 |
| 22 MPH | 0.0/1.9 | 0.5/3.9 | 0.7/4.0 | 0.9/4.1 | 1.2/4.6 | 1.1/4.2 |
| 24 MPH | 0.0/2.1 | 0.1/2.3 | 0.8/4.4 | 0.8/4.2 | 1.3/5.0 | 1.4/4.8 |
| 26 MPH | 0.0/2.3 | 0.1/2.5 | 0.5/4.0 | 0.9/4.5 | 1.0/4.4 | 1.2/4.6 |
| 28 MPH | 0.0/2.5 | 0.0/2.1 | 0.1/2.4 | 0.7/4.2 | 0.8/4.1 | 0.5/3.2 |
| 30 MPH | 0.0/2.7 | 0.0/2.3 | 0.1/2.6 | 0.1/2.3 | 0.8/4.4 | 1.2/5.0 |
| 32 MPH | 0.0/2.8 | 0.0/2.4 | 0.1/2.8 | 0.1/2.5 | 0.9/4.7 | 1.1/4.9 |
| 34 MPH | 0.0/3.0 | 0.0/2.3 | 0.0/2.0 | 0.0/1.8 | 0.6/4.2 | 1.2/5.3 |

Fig. 8

OPTIMIZED SINGLE POINT, PASSENGER COMPARTMENT MOUNTED SENSOR PERFORMANCE

| SCALED VELOCITY | \multicolumn{7}{c}{BARRIER SCALING FACTOR} |
|---|---|---|---|---|---|---|---|
|  | 1 | 1.2 | 1.4 | 1.6 | 1.8 | 2 |
| 8 MPH | NT | NT | NT | NT | NT | NT |
| 10 MPH | 4.7/10.3* | NT | NT | NT | NT | NT |
| 12 MPH | 2.2/6.7 | 5.8/12.1 | NT | NT | NT | NT |
| 14 MPH | 2.2/7.2 | 2.7/7.5 | 3.9/8.9 | NT | NT | NT |
| 16 MPH | 2.2/7.6 | 2.7/7.9 | 3.4/8.5 | 4.2/9.3 | NT | NT |
| 18 MPH | 2.2/8.0 | 2.8/8.7 | 3.6/9.2 | 4.2/9.7 | 5.0/10.5 | 17.8/27.5 |
| 20 MPH | 2.0/7.9 | 3.1/9.3 | 3.7/9.7 | 4.3/11.2 | 5.0/10.9 | 5.9/11.7 |
| 22 MPH | 1.0/5.3 | 2.7/8.9 | 3.9/10.4 | 4.5/10.9 | 5.2/11.5 | 5.9/12.2 |
| 24 MPH | .5/4.2 | 1.6/6.5 | 3.9/10.8 | 4.8/11.6 | 5.4/12.0 | 6.1/12.8 |
| 26 MPH | .4/4 | 1.2/5.7 | 2.0/6.8 | 4.5/11.5 | 5.8/13 | 6.4/13.5 |
| 28 MPH | .4/4.1 | .6/4.0 | 1.8/6.6 | 2.7/7.8 | 5.9/13.5 | 6.8/14.4 |
| 30 MPH | .4/4.2 | .5/4.0 | .8/4.2 | 2.2/6.9 | 6.4/14.5 | 7.1/15.1 |
| 32 MPH | .3/4.2 | .5/4.1 | .7/7.2 | 2.1/7.0 | 2.6/7.4 | 3.4/8.4 |
| 34 MPH | .3/4.0 | .5/4.2 | .7/4.3 | .9/4.5 | 2.6/7.5 | 4.0/9.6 |

Fig. 9

METHOD AND APPARATUS FOR SENSING A VEHICLE CRASH

BACKGROUND OF THE INVENTION

Pattern recognition techniques, such as artificial neural networks are finding increased application in solving a variety of problems such as optical character recognition, voice recognition, and military target identification. In the automotive industry, pattern recognition techniques have now been applied to identify various objects within the passenger compartment of the vehicle, such as a rear facing child seat, as well as to identify threatening objects such as an approaching vehicle about to impact the side of the vehicle. See, for example, copending patent applications Ser. No. 08/239,978 filed May 9, 1994 and Ser. No. 08/247,760 filed May 23, 1994 which are included herein by reference. Heretofore, pattern recognition techniques have not been applied to sensing automobile crashes for the purpose of determining whether or not to deploy an airbag or other passive restraint, or to tighten the seatbelts, cutoff the fuel system, or unlock the doors after the crash.

"Pattern recognition" as used herein means any system which processes a signal that is generated by an object, or is modified by interacting with an object, in order to determine which one of a set of classes the object belongs to. Such a system might determine only that the object is or is not a member of one specified class, or it might attempt to assign the object to one of a larger set of specified classes, or find that it is not a member of any of the classes in the set. The signals processed are generally electrical signals coming from transducers which are sensitive to either acceleration, or acoustic or electromagnetic radiation and, if electromagnetic, they can be either visible light, infrared, ultraviolet or radar.

To "identify" as used herein means to determine that the object belongs to a particular set or class. The class may be one containing all frontal impact airbag desired crashes, one containing all events where the airbag is not required, one containing all events requiring the passenger headrest to be moved into position, or one containing all events requiring the deployment of an airbag in the event of side impacts depending on the purpose of the system.

All electronic crash sensors currently used in sensing frontal impacts include accelerometers which detect and measure the vehicle accelerations during the crash. The accelerometer produces an analog signal proportional to the acceleration experienced by the accelerometer and hence the vehicle on which it is mounted. An analog to digital converter transforms this analog signal into a digital time series. Crash sensor designers study this digital acceleration data and derive therefrom computer algorithms which determine whether the acceleration data from a particular crash event warrants deployment of the airbag. This is usually a trial and error process wherein the engineer or crash sensor designer observes data from crashes where the airbag is desired and when it is not needed, and other events where the airbag is not needed. Finally, the engineer or crash sensor designer settles on an algorithm which seems to satisfy the requirements of the crash library, i.e., the crash data accumulated from numerous crashes and other events. The resulting algorithm is not universal and most such engineers or crash sensor designers will answer in the negative when asked whether their algorithm will work for all vehicles.

Several papers have been published pointing out some of the problems and limitations of electronic crash sensors which are mounted out of the crush zone of the vehicle, usually in a protected location in the passenger compartment of the vehicle, the crush zone being defined as that portion of the vehicle which has crushed at the time that the crash sensor must trigger deployment of the restraint system. These sensors are frequently called single point crash sensors. Technical papers which discuss these limitations along with discussions of the theory of crash sensing, which are relevant to this invention and which are included herein by reference, are:

1) Breed, D. S. and Castelli, V. "Problems in Design and Engineering of Air Bag Systems", Society of Automotive Engineers Paper SAE 880724, 1992.
2) Breed, D. S., Castelli, V. "Trends in Sensing Frontal Impact", Society of Automotive Engineers Paper SAE 890750, 1989.
3) Breed, D. S., Sanders, W. T. and Castelli, V. "A Critique of Single Point Crash Sensing", Society of Automotive Engineers Paper SAE 920124, 1992.
4) Breed, D. S., Sanders, W. T. and Castelli, V. "A complete Frontal Crash Sensor System-I", Society of Automotive Engineers Paper SAE 930650, 1993.
5) Breed, D. S. and Sanders, W. T. "Using Vehicle Deformation to Sense Crashes", Presented at the International Body and Engineering Conference, Detroit Mich., 1993.
6) Breed, D. S., Sanders, W. T. and Castelli, V., "A complete Frontal Crash Sensor System-II", Proceedings Enhanced Safety of Vehicles Conference, Munich, 1994, Published by the US Department of Transportation, National Highway Traffic Safety Administration, Washington, D.C.

These papers demonstrate, among other things, that there is no known theory which allows an engineer to develop an algorithm for sensing crashes and selectively deploying the airbag except when the sensor is located in the crush zone of the vehicle. These papers show that, in general, there is insufficient information within the acceleration signal measured in the passenger compartment to sense all crashes. Another conclusion supported by these technical papers is that if an algorithm can be found which works for one vehicle, it will also work for all vehicles since it is possible to create any crash pulse in any vehicle. See in particular SAE paper 920124 referenced above.

In spite of the problems associated with finding the optimum crash sensor algorithm, many vehicles on the road today have electronic single point crash sensors. Some of the problems associated with single point sensors result in that an out-of-position occupant who is sufficiently close to the airbag at the time of deployment is likely to be injured or killed by the deployment itself. Fortunately, systems are now being developed which monitor the location of occupants within the vehicle and can suppress deployment of the airbag if the occupant is more likely to be injured by the deployment then by the accident.

Since there is insufficient information in the acceleration data, as measured in the passenger compartment, to sense all crashes and since some of the failure modes of published single point sensor algorithms can be easily demonstrated using the techniques of crash and velocity scaling described in the above referenced technical papers, and moreover since the process by which engineers develop algorithms is based on trial and error, pattern recognition techniques such as neural network should be able to be used to create an algorithm based on training the system on a large number of crash and non-crash events which will be superior to all others. This in fact has proved to be true and is the subject of this invention.

Naturally, once any crash sensor has determined that an airbag should be deployed, the system should perform several other functions such as tightening the seatbelts for those vehicles which have seatbelt retractor systems, cutting off of the fuel system to prevent fuel spillage during or after the crash, and unlocking the doors after the crash to make it easier for the occupants to escape.

The use of pattern recognition techniques in crash sensors has another significant advantage in that it can share the same pattern recognition hardware and software as other systems in the vehicle. Pattern recognition techniques have proven to be effective in solving other problems related to airbag passive restraints. In particular, the identification of a rear-facing child seat located on the front passenger seat, so that the deployment of the airbag can be suppressed, has been demonstrated. Also, the use of pattern recognition techniques for the classification of vehicles about to impact the side of the subject vehicle for use in anticipatory side impact crash sensing shows great promise. Both of these pattern recognition systems, as well as others under development, can use the same computer system as the crash sensor of this invention. Moreover, both of these systems will need to interact with the main sensor and diagnostic module used for frontal impacts. It would be desirable for cost and reliability considerations, therefore, for all three systems to use the same computer system. This is particularly desirable since computers designed specially for solving pattern recognition problems, such as neural-computers, are now becoming available.

SUMMARY OF THE INVENTION

The present invention uses pattern recognition techniques such as a neural network, or neural network derived algorithm, to analyze the digitized accelerometer data created during a crash to determine if and when a passive restraint such as an airbag should be deployed.

Principal objects and advantages include:

1) To provide a single point sensor including an accelerometer which makes maximum use of the information in the acceleration data to determine whether an airbag should be deployed.
2) To provide a universal single point crash sensor which can be used on most automobiles without any modification required specific to each automobile.
3) To provide a single computer system which can perform several different pattern recognition functions within an automobile including, for example, crash sensing, identification of an object located within the vehicle passenger compartment, and the categorization of objects exterior to the vehicle.
4) To provide a crash sensor algorithm which is derived by training using a set of data derived from staged automobile crashes and non-crash events as well as other analytically derived data.
5) To provide a crash sensor based on pattern recognition techniques.
6) To provide a crash sensor which uses other data in addition to acceleration data derived from the crash wherein this data is combined with acceleration data and, using pattern recognition techniques, the need for deployment of a passive restraint is determined.
7) To provide a crash sensor which can be used for sensing both frontal, side, and rear impacts.
8) To provide a crash sensor which automatically retains the crash acceleration data from a period of time prior to the airbag deployment for later analysis.
9) To provide a crash sensor which uses a neural computer.

Other objects and advantages of this invention will become apparent from the disclosure which follows.

Generally, the present invention relates to a sensor system for initiating deployment of an occupant protection apparatus in a motor vehicle, such as an airbag, to protect an occupant of the vehicle in a crash. The system includes a sensor mounted to the vehicle for sensing accelerations of the vehicle and producing an analog signal representative thereof, an electronic converter for receiving the analog signal from the sensor and for converting the analog signal into a digital signal, and a processor which receives the digital signal. The processor includes a pattern recognition system and produces a deployment signal when the pattern recognition system determines that the digital signal contains a pattern characteristic of a vehicle crash requiring occupant protection.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
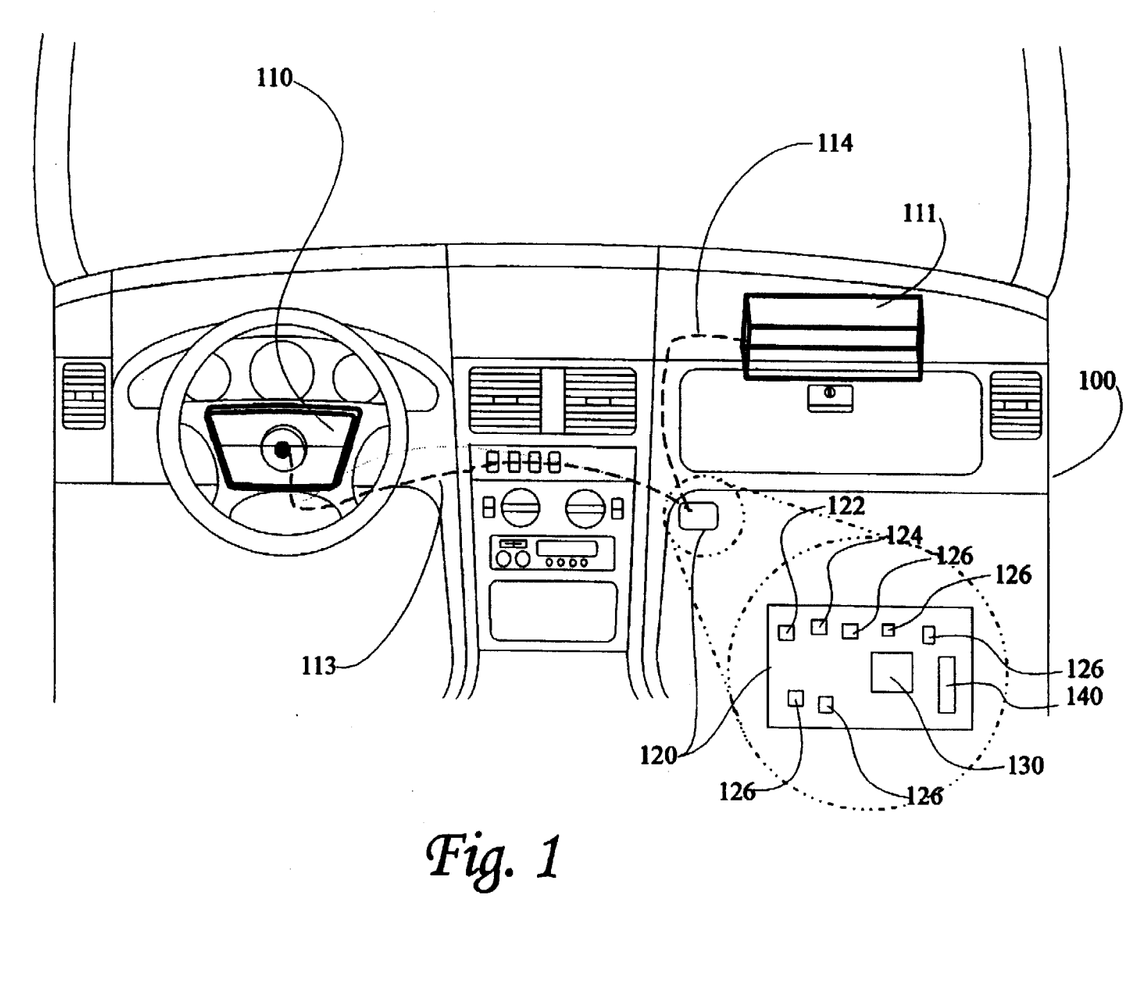
FIG. 1 is a view of the front of the passenger compartment of a motor vehicle, with portions cut away and removed, having dual airbags and a single point crash sensor including an accelerometer and using a pattern recognition technique.

Typically, the electronic sensor and diagnostic module (SDM) is mounted at a convenient location in the passenger compartment such as the transmission tunnel or firewall. FIG. 1 is a view of the front of a passenger compartment 100 of an automobile with portions cut away and removed, having dual airbags 110, 111 and an SDM 120 containing a single point crash sensor comprising a tri-axial accelerometer 122, an analog to digital converter 124 and a pattern recognition algorithm contained within a microprocessor 130. A tri-axial accelerometer is a device which includes three accelerometers and measures accelerations in three orthogonal directions which are typically the longitudinal, lateral and vertical directions. The circuit board of the SDM 120 also contains a capacitor 140 as a backup power supply, other electronic components 126 and various circuitry. The SDM is connected to the airbags with wires 113 and 114. In this embodiment the pattern recognition technique used is a neural network which analyzes data from all three accelerometers to determine whether the vehicle is experiencing a crash from any direction. If the neural network determines, e.g., by analysis of a pattern in the signal emanating from the accelerometer, that the accident merits deployment of a restraint system, such as a frontal or side airbag or a movable headrest, it initiates such deployment and thus constitutes in this regard airbag deployment initiation means. For frontal impacts, for example, a signal is sent through wires 113 and 114 to initiate deployment of airbags 110 and 111. The analog to digital converter 124 is connected to the sensor, in this case the tri-axial accelerometer, and converts an analog signal generated by one of the accelerometers representative of the acceleration thereof, and thus the vehicle, into a digital signal. In one embodiment, the converter 124 derives the digital signal from the integral of the analog signal.

The tri-axial accelerometer is mounted by suitable mounting means to the vehicle and can be mounted in a variety of positions to sense, e.g., frontal impacts, side impacts or rear impacts. In other embodiment described below, the microprocessor 130 may include detection means for detecting when the occupant to be protected by the deployable occupant protection apparatus in accordance with the invention is out-of-position and thereupon to suppress deployment of the airbag. Also, the detection means may be applied to detect the presence of a rear-facing child seat positioned on a passenger seat and thereupon to suppress deployment of the airbag.

Throughout much of the discussion herein, the neural network will be used as an example of a pattern recognition technique or algorithm since the neural network is one of the most developed of such techniques. However, it has serious limitations which are now being addressed with the development of newer pattern recognition techniques. These limitations involve the difficulty in describing the process which is used in classifying patterns with the result that there is a fear that a pattern which wasn't part of the training set might be missed. Also, the training process of the neural network does not guarantee that convergence to the best solution will result. This is known as the local minimum problem wherein the training algorithm converges on a result which is not the best overall solution. These problems are being solved with the development of newer pattern recognition techniques such as disclosed in U.S. Pat. No. 5,390,136 and patent application Ser. No. 08/076,601, both of which are included herein by reference and which are, in fact, improvements to neural networks. The invention disclosed herein is the use of pattern recognition techniques, regardless of the particular technique, to provide a superior crash sensor for use with airbags.

The pattern recognition crash sensor described and illustrated in FIG. 1 uses information from three accelerometers each measuring acceleration from an orthogonal direction. As will be described in more detail below, other information can also be considered by the pattern recognition algorithm such as the position of the occupants, noise, data from anticipatory acoustic or radar sensors, or any other information present in the vehicle which is relevant. Since the pattern recognition algorithm is trained on data from real crashes and non-crash events, it can handle data from many different information sources and sort out what patterns correspond to airbag-required events in a way which is impossible for an engineer to do. For this reason, a crash sensor based on neural networks, for example, will always perform better than one devised by engineers. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; and, *Digital Neural Networks*, by Kung, S. Y., PTR Prentice Hall, Englewood Cliffs, N.J., 1993.

Figure 2:
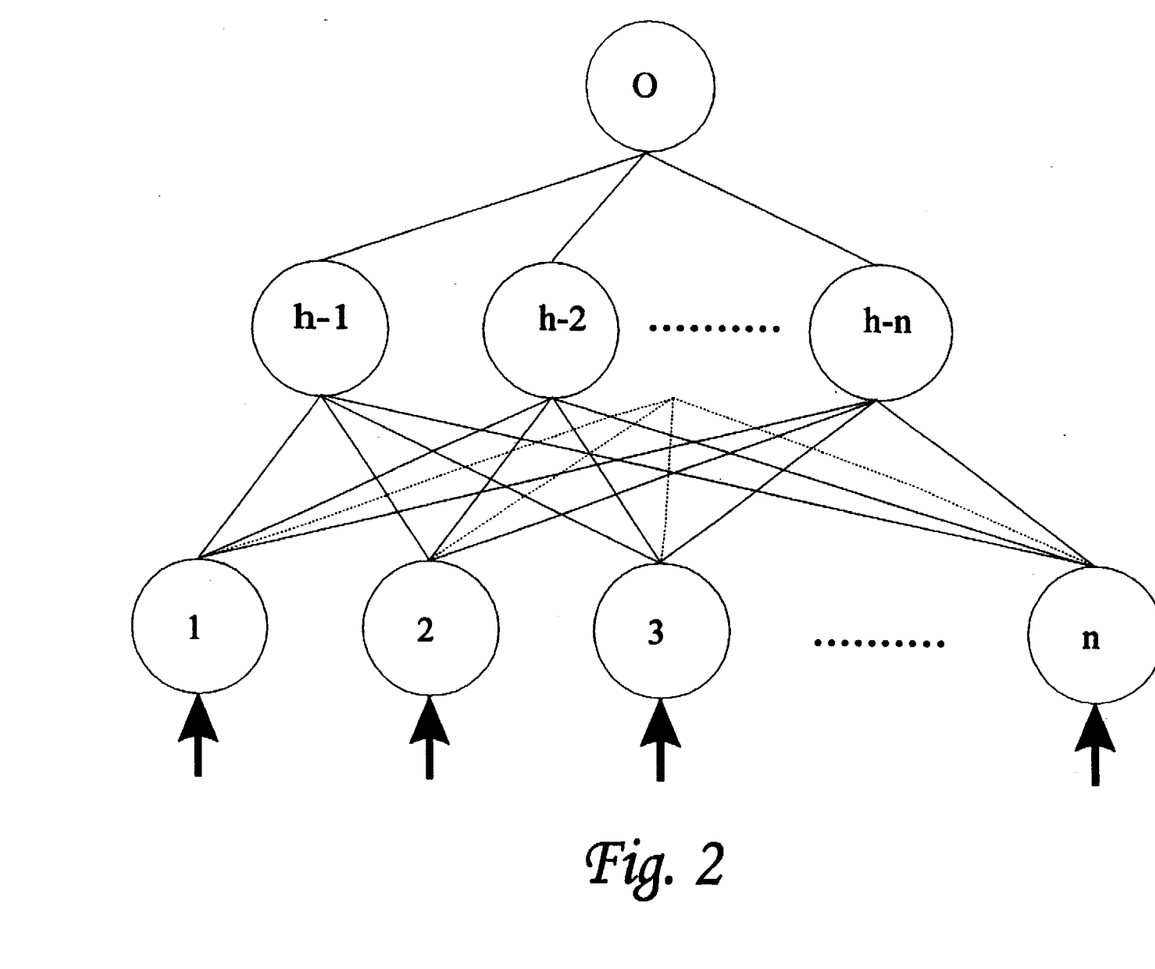
FIG. 2 is a diagram of a neural network used for a crash sensor designed based on the teachings of invention.

A diagram of one example of a neural network used for a crash sensor designed based on the teachings of this invention is shown in FIG. 2. The process can be programmed to begin when an event occurs which indicates an abnormal situation such as the acceleration in the longitudinal direction, for example, exceeding the acceleration of gravity or can take place continuously depending on the demands on the computer system. The digital acceleration value from the analog to digital converter is entered into node 1 and the neural network algorithm compares the pattern of values on nodes 1 through N with patterns for which it has been trained. Each of the input nodes is connected to each of the second layer nodes h-1, . . . ,h-n, called the hidden layer, either electrically as in the case of a neural computer, to be described below, or through mathematical functions containing multiplying coefficients called weights, also described in more detail below. The weights are determined during the training phase while creating the neural network as described in detail in the above text references. At each hidden layer node, a summation occurs of the values from each of the input layer nodes, which have been operated on by functions containing the weights, to create a node value. Similarly, the hidden layer nodes are connected to the output layer nodes, which in this example is only a single node representing the decision to deploy or not to deploy the airbags. During the training phase, an output node value of 1, for example, is assigned to mean deploying the airbag and a value of 0 is assigned to not deploying the airbag. Once again, the details of this process are described in above-referenced texts and will not be presented in detail here.

A time step such as two milliseconds is selected as the period at which the analog to digital converter (ADC) averages the output from the accelerometers and feeds data to input node 1. Thus, at time equal to 2 milliseconds from the start of the process, node 1 contains a value obtained from the ADC and the remaining input nodes have a random value or a value of 0. At time equal 4 milliseconds, the value which was on node 1 is transferred to node 2 and a new value from the ADC is fed into node 1. In a similar manner, data continues to be fed from the ADC to node 1 and the data on node 1 is transferred to node 2 whose previous value was transferred to node 3 etc. Naturally, the actual transfer of data to different memory locations need not take place but only a redefinition of the location which the neural network should find the data for node 1. For one preferred embodiment of this invention, a total of one hundred input nodes were used representing two hundred milliseconds of acceleration data. At each step, the neural network is evaluated and if the value at the output node exceeds some value such as 5 then the airbags are deployed by the remainder of the electronic circuit. In this manner, the system does not need to know when the crash begins, that is, there is no need for a separate sensor to determine the start of the crash or of a particular algorithm operating on the acceleration data to make that determination.

In the example above, one hundred input nodes were used, twelve hidden layer nodes and one output layer node. In this example, accelerations from only the longitudinal direction were considered. If other data such as accelerations from the vertical or lateral directions were also used, then the number of input layer nodes would increase. If the neural network is to be used for sensing rear impacts, or side impacts, 2 or 3 output nodes might be used, one for each decision. The theory for determining the complexity of a neural network for a particular application has been the subject of many technical papers and will not be presented in detail here. Determining the requisite complexity for the example presented herein can be accomplished by those skilled in the art of neural network design and is discussed briefly below. In another implementation, the integral of the acceleration data is used and the number of input nodes is significantly reduced.

The neural network described above defines a method of sensing a crash and determining whether a deployable occupant protection device should be deployed and comprises the steps of:

(a) obtaining an acceleration signal from an accelerometer mounted on a vehicle;

(b) converting the acceleration signal into a digital time series;

(c) entering the digital time series data into the input nodes of a neural network;

(d) performing a mathematical operation on the data from each of the input nodes and inputting the operated-on data into a second series of nodes wherein the operation performed on each of the input node data prior to inputting the operated on value to a second series node is different from that operation performed on some other input node data;

(e) combining the operated-on data from all of the input nodes into each second series node to form a value at each second series node;

(f) performing a mathematical operation on each of the values on the second series of nodes and inputting the operated-on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) deploying an airbag if the value on one output series node is within a selected range signifying that a crash requiring the deployment of an airbag is underway.

The particular neural network described and illustrated above contains a single series of hidden layer nodes. In some network designs, more than one hidden layer is used although only rarely will more than two such layers appear. There are of course many other variations of the neural network architecture illustrated above which appear in the literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor or in a neural computer. Neural computer chips are now becoming available. As more advanced pattern recognition techniques are developed, especially designed chips can be expected to be developed for these techniques as well.

In the particular implementation described above, the neural network was trained using crash data from approximately 25 crash and non-crash events. In addition, the techniques of velocity and crash scaling, as described in the above referenced technical papers, were used to create a large library of crashes representing many events not staged by the automobile manufacturer. The resulting library, it is believed, represents the vast majority of crash events which occur in real world accidents for the majority of automobiles. Thus, the neural network algorithm comes close to the goal of a universal electronic single point sensor usable on most if not all automobiles. The results of this algorithm for a matrix of crashes created by the above mentioned velocity and crash scaling technique appears in FIG. 8. An explanation of the meaning of the numbers in the table can be found in the technical paper titled "Trends In Sensing Frontal Impacts" referenced above and is summarized below. In that paper, FIG. 9 presents the results of an optimized passenger compartment single point sensor and is reproduced here as FIG. 9 for comparison with FIG. 8. The sensor analyzed in the technical paper is currently on at least one production automobile sold in the United States. This comparison illustrates the dramatic improvement achievable through the use of pattern recognition techniques.

Once a pattern recognition computer system is implemented in a vehicle, the same system can be used for many other pattern recognition functions such as the airbag system diagnostic. Testing that the pattern of the airbag system during the diagnostic test on vehicle startup, as represented by the proper resistances appearing across the wires to the various system components, for example, is an easy task for a pattern recognition system. In other words, the pattern recognition system, which may be a neural computer, is coupled to the airbag system and structured and arranged to diagnose the readiness of deployment of the airbag upon the beginning of operation of the vehicle since by performing a diagnostic test on startup, the readiness of the system is determined. The system can thus do all of the functions of the conventional SDM, sensing and diagnostics, as well as others.

In U.S. patent application Ser. No. 08/239,978 referenced above, the use of neural networks as a preferred pattern recognition technology is disclosed for use in identifying a rear facing child seat located on the front passenger seat of an automobile. This same patent application also discloses many other applications of pattern recognition technologies for use in conjunction with monitoring the interior of an automobile passenger compartment.

Figure 3:
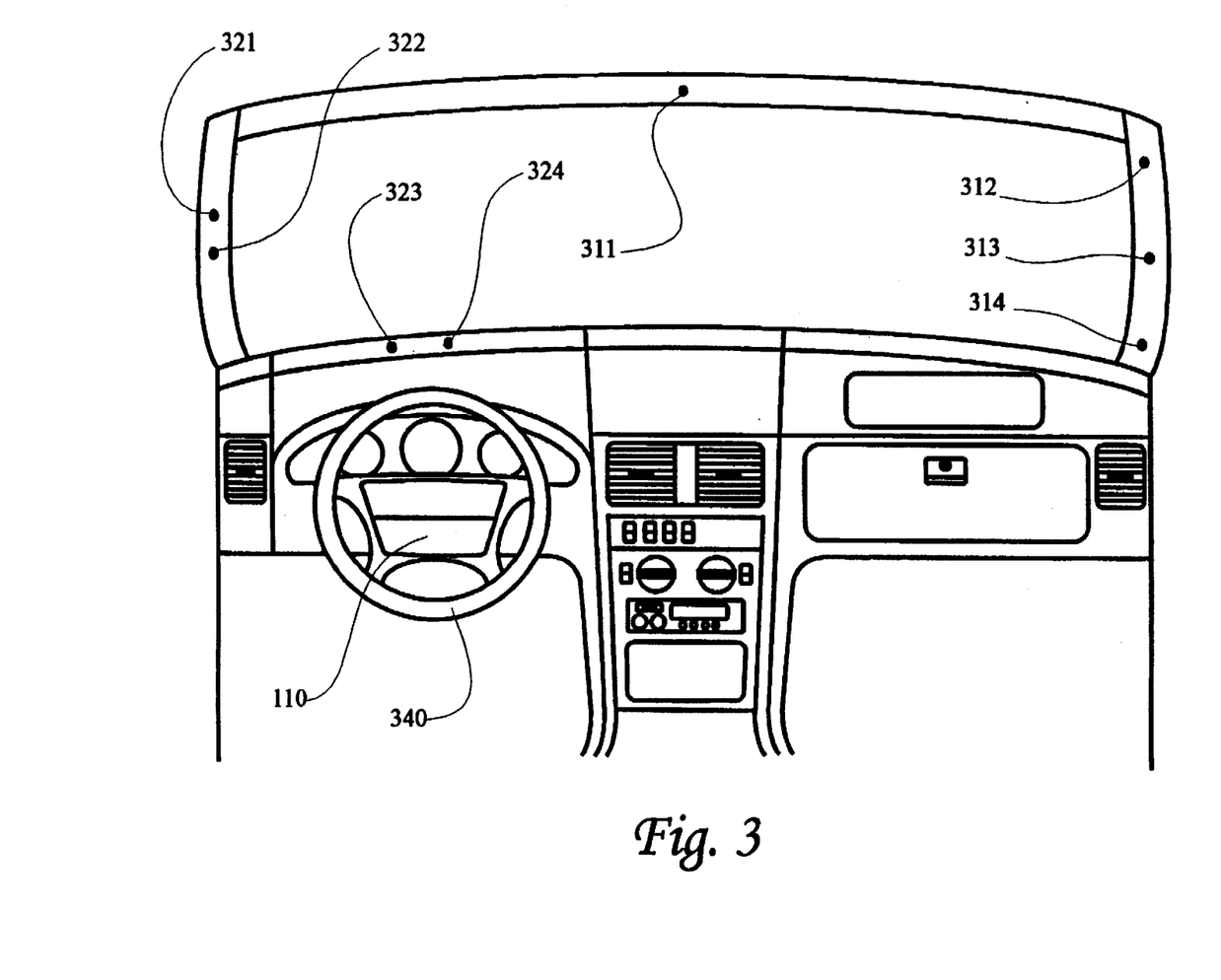
FIG. 3 is a view of the passenger compartment of a motor vehicle, with portions cut away and removed, illustrating an occupant out-of-position sensor and a rear facing child seat detector, both located on the A-pillar and both using the same computer as the pattern recognition based crash sensor.

In FIG. 3 a view of the passenger compartment of a motor vehicle is presented which illustrates an occupant out-of-position sensor and a rear facing child seat detector, both located on the A-pillar of the vehicle and both using the same neural computer as the neural network crash sensor. Thus, once one neural network application for an automobile is implemented, the same neural network computer system can be used for several pattern recognition applications.

The use of the neural network to identify a rear facing child seat occurs when the vehicle is first put in motion. In contrast, the use of the neural network for crash pattern recognition occurs continuously but need only take place when an abnormal event is taking place. Since it is highly unlikely that both events will take place simultaneously, the same system can easily accomplish both tasks. Naturally, in event of a conflict, one of the functions takes priority. A strong motivation for the use of a neural network crash sensor, therefore, in addition to its superior performance, is that substantial economies result. Heretofore, neither the use of neural networks for interior vehicle monitoring or for crash sensing have been discovered let alone the greater advantage of combining both functions with the same neural network system.

An interesting point is that each of these features can be added at very little additional cost once one system is implemented. The distance measurement to determine an out-of-position occupant is a minor software change and the addition of the driver system once a passenger system is in place, or vice versa, requires only additional transducers which are inexpensive in large quantities. Since both the driver and passenger systems can share the same electronics, there will be virtually no additional cost for electronic components.

In FIG. 3, four ultrasonic transducers 311, 312, 3 13, and 314, are used to identify an object occupying the front passenger seat as described in U.S. patent application Ser. No. 08/239,978 referenced above. In this particular implementation, an additional transducer 311 is provided to improve the identification accuracy of the system. Ultrasonic transducers 321 and 322 are used to determine the distance from the transducers to the vehicle driver and ultrasonic transducers 323 and 324 are used to measure the distance to the steering wheel mounted airbag module 110 and also to the driver. The second measurement of the driver's position is used to confirm the measurements obtained from transducers 321 and 322. The distance from the airbag can be calculated knowing the distance to the driver and the distance to the steering wheel 340. Naturally, other types of transducers or measurement means could be used without deviating from the teachings of this invention. What is illustrated and taught here is that there are many applications requiring pattern recognition technologies which can be achieved very economically through sharing pattern recognition computer facilities.

Figure 4:
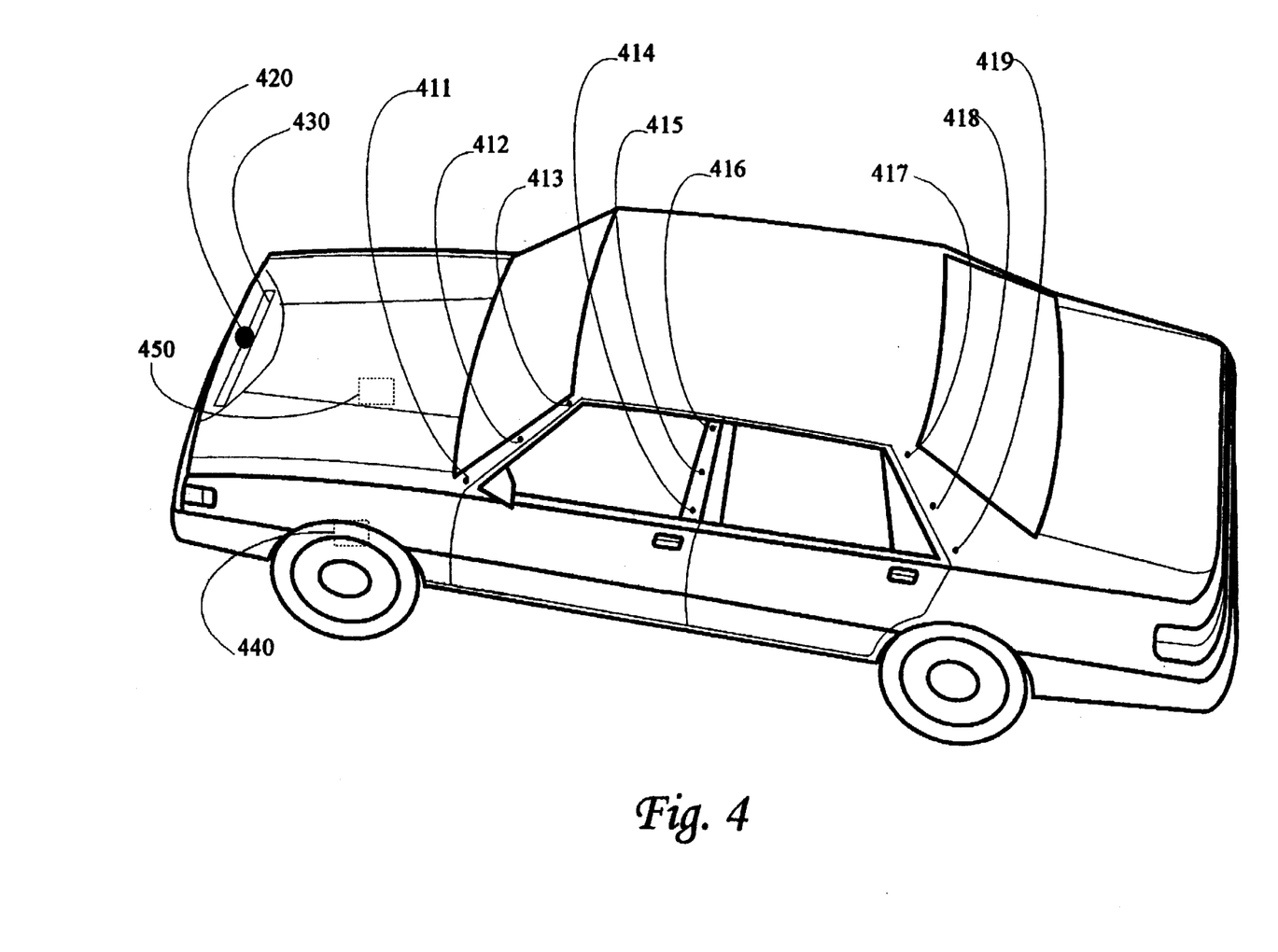
FIG. 4 is a perspective view of an automobile, as viewed partially from above, of a side impact anticipatory sensor system using the same computer as the single point crash sensor and also showing inputs from a front mounted crush zone sensor, an engine speed sensor, and an antilock braking system sensor.

In another example, FIG. 4 illustrates a side impact anticipatory sensor system, shown here as transducers 411–419 which are situated in different locations on the side of the vehicle, using the same computer system as discussed above, and coupled thereto by suitable means. FIG. 4 also illustrates additional inputs which, in some applications, provide useful information in determining whether an airbag should be deployed, for example. These include inputs from a from mounted crash sensor 420 mounted on the vehicle radiator 430, an engine speed sensor 440, and a wheel speed sensor 450 as used in the antilock braking system sensor.

Figure 5:
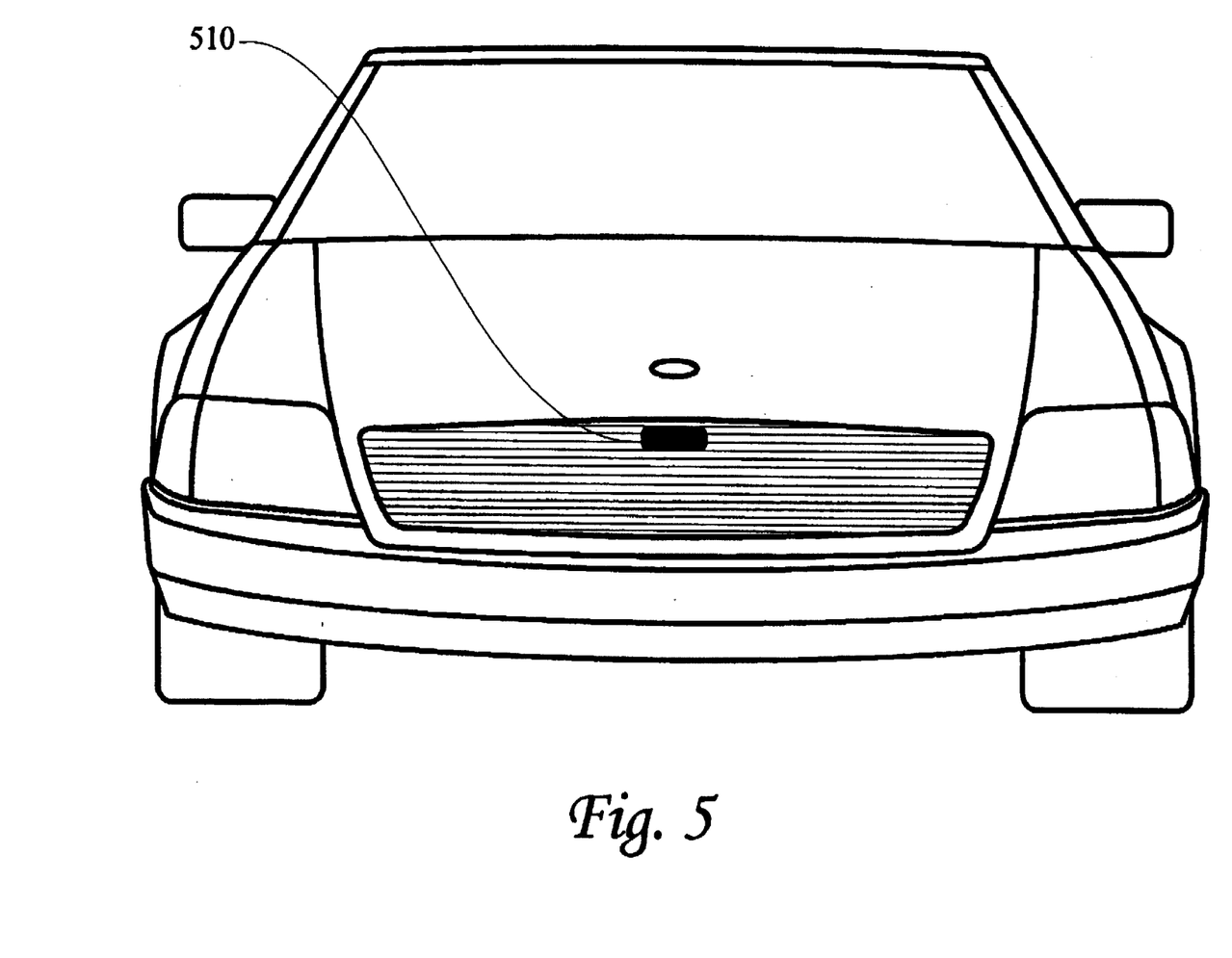
FIG. 5 is a frontal view of an automobile showing the location of a radar collision avoidance sensor which uses the same pattern recognition computer system as the crash sensor.

Collision avoidance systems currently under development use radar to locate objects such as other vehicles which are in a potential path of the subject vehicle. In some systems, a symbol is projected onto the windshield in a heads-up display signifying that some object is within a possible collision space with the subject vehicle. No attempt at present is made to determine what that object is and to display an image of the object. Neural network pattern recognition systems, as well as other pattern recognition systems, have that capability and future collision avoidance systems will undoubtedly need this capability. Naturally, as above, the same pattern recognition computer system which is proposed herein for sensing crashes can also the used for collision avoidance pattern recognition. FIG. 5 is a frontal view of an automobile showing the location of a radar collision avoidance sensor 510 which uses the same neural computer system as the crash sensor discussed above and thus is coupled thereto.

Figure 6:
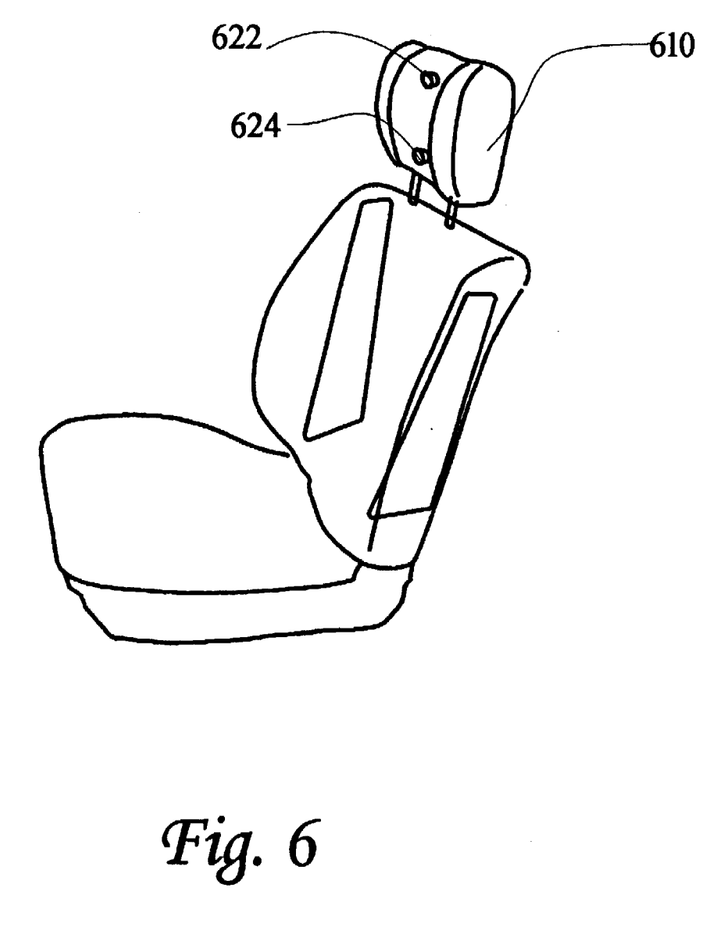
FIG. 6 is a perspective view of a vehicle seat and headrest containing ultrasonic head cation sensors consisting of one transmitter and one receiver.

In FIG. 6, an occupant position sensor arrangement 622, 624 located in a headrest 610 of an automobile seat is illustrated. Such a sensor can be used to automatically position the headrest 610 for protection of occupants in rear impacts, as part of a system to automatically adjust the position of the seat based on the morphology of the occupant, and to monitor the position of the head in the event of a frontal impact. In each case, the sensor may interface with the neural network computer system which is used for crash sensing. In the case of rear impact protection, for example, the neural computer, using information from the accelerometers, may determine that a rear impact is in progress and command the headrest to move closer to the occupant's head. If an anticipatory sensor is used for predicting a rear impact, the neural computer can be used to identify the approaching object and decide if positioning the headrest is warranted. In the case where the longitudinal position of the occupants head is monitored, then the neural crash sensor would take this into account along with other occupant position information, if available, in determining whether to deploy the airbag if the occupant is out-of-position.

The pattern recognition algorithm which forms an integral part of the crash sensor described herein can be implemented either as an algorithm using a conventional microprocessor or through a neural computer which has only recently become available. In the former case, the training is accomplished using a neural pattern recognition program and the result is a computer algorithm frequently written in the C computer language, although many other computer languages such as FORTRAN, assembly, Basic, etc. could be used. In the latter case, the same neural computer can be used for the training as used on the vehicle. Neural network software for use on a conventional microcomputer is available from several sources such as NeuralWare of Pittsburgh, Pa. An example of an algorithm produced by the NeuralWare software after being trained on a crash library created by using data supplied by an automobile manufacturer for a particular model vehicle plus additional data created by using the techniques of crash and velocity scaling is:

---

* Neural net for crash sensor. 23 August 94. 50 input nodes,
* 6 hidden nodes (sigmoid transfer function), 1 output node (value 0 or 1).
* Network was trained using back propagation with Logicon Projection.
* Yin(1–50) are raw input values. Xin(1–50) are scaled input values.
* Yin(50) is the sum of the latest 25 accelerations, in tenths of a g,
* Yin(49) is the sum of the previous 25, etc. The time step is 80 microsec.
logical function nnmtlpn3(Yin, firesum, Yout)
real*4 firesum, Yin(50), Yout
integer i, j
real*4 biashid(6), biasout, fire_criterion, hiddenout(6), NormV, NV(4),
& offset_in(50), offset_out, scale_in(50), scale_out, wgthid(51,6),
& wgtout(6), Xin(51), Xsum
parameter( fire_criterion = 0.0 )
data scale_in/(omitted)/
data offset_in/(omitted)/
data scale_out, offset_out/0.625, 0.5/
data NV/2.0, 7.0, 7.0711002, 50.000458/
data biashid/–49.110764, –69.856407, –48,670643,
& –48.36599, –52.745285, –49.013027/
data biasout/0.99345559/
data wgthid/(omitted)/
data wgtout/(omitted)/
NormV = 0.0
do i=1,50
Xin(i) = scale_in(i) * Yin(i) - offset_in(i)
NormV = NormV + Xin(i) * Xin(i)

-continued

```
enddo
NormV = NV(1) * NV(2) * NV(3)/(NV(4) + NormV)
do i=1,50
Xin(i) = NormV * Xin(i)
enddo
Xin(51) = NV(2) - NV(3) * NormV
do i=1,6
Xsum = biashid(i)
do j=1,51
Xsum = Xsum + wgthid(j,i) * Xin(j)
enddo
hiddenout(i) = 1.0/1.0 + exp( -Xsum))
enddo
firesum = biasout
do i=1,6
firesum = firesum + wgtout(i) * hiddenout(i)
enddo
Yout = offset_out + scale_out * tanh(firesum)
if( firesum .GE. fire_criterion) then
mmtlpn3 = .TRUE.
else
mmtlpn3 = .FALSE.
endif
return
end
```

Neural computers on a chip are now becoming from various chip suppliers. These chips make use of massively parallel architecture and allow all of the input data to be processed simultaneously. The result is that the computation time required for a pattern to be tested changes from the order of milliseconds for the case of the microprocessor implemented system to the order of microseconds for the neural computer. With this computational speed, one neural computer can easily be used for several pattern recognition implementations simultaneously even during the crash event. A discussion of the structure of such a neural computer can be found on page 382 of the reference book by Kung listed above.

Figure 7:
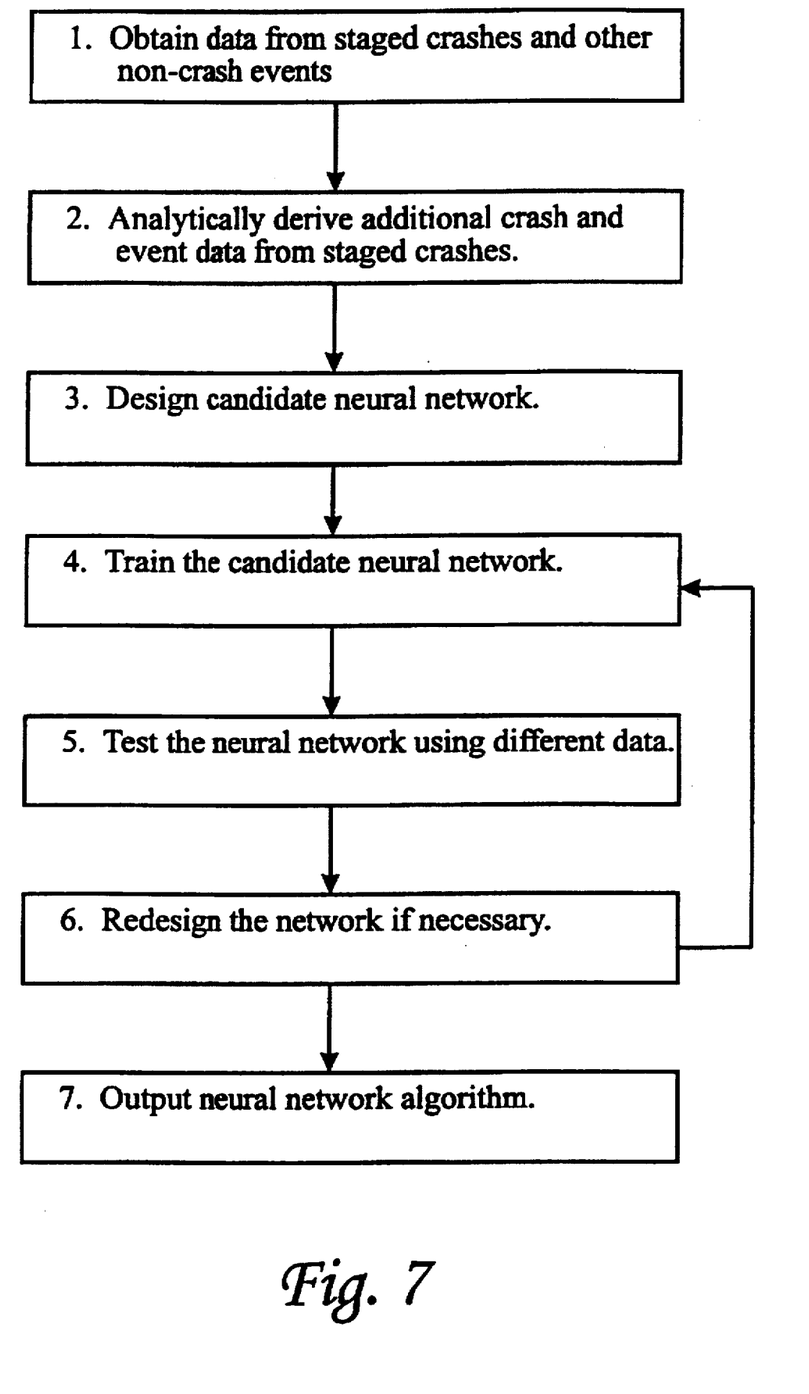
FIG. 7 is a block diagram illustrating a method of obtaining a sensor algorithm using a neural network.

A block diagram of the neural network computer method of obtaining a sensor algorithm is illustrated in FIG. 7. In the first step, one or more vehicle models are crashed under controlled conditions where the vehicle and crash dummies are fully instrumented so that the severity of the crash, and thus the need for an airbag, can be determined. The acceleration during the crash is measured at all potential locations for mounting the crash sensor. Normally, any position which is rigidly attached to the main structural members of the vehicle is a good mounting location for the sensor.

The following crash event types, at various velocities, are representative of those which should be considered in establishing crash sensor designs and calibrations:

Frontal Barrier Impact
Right Angle Barrier Impact
Left Angle Barrier Impact
Frontal Offset Barrier Impact
Frontal Far Offset (Outside of Rails) Barrier Impact
High Pole on Center Impact
High Pole off Center Impact
Low Pole (below bumper) Impact
Frontal Car-to-Car Impact
Partial Frontal Car-to-Car Impact
Angle car-to-car Impact
Front to Rear car-to-car Impact
Front to Side Car-to-Car Impact, Both Cars Moving
Bumper Underride Impact
Animal Impact—Simulated Deer
Undercarriage Impact (hangup on railroad track type of object)
Impact Into Highway Energy Absorbing Device (Yellow Barrels, etc.)
Impact Into Guardrail
Curb Impacts The following non-crash event types are representative of those considered in establishing crash sensor designs and calibrations:

Hammer Abuse (shop abuse)
Rough Road (rough driving conditions)

Normally, a vehicle manufacturer will only be concerned with a particular vehicle model and instruct the crash sensor designer to design a sensor for that particular vehicle model. This is not necessary when using the techniques described herein and vehicle crash data from a variety of different vehicle models can be included in the training data.

The vehicle manufacturer will be loath to conduct all of the crashes listed above for a particular vehicle since crash tests are very expensive. If, on the other hand, a particular crash type which occurs in the real word is omitted from the library, there is a chance that the system will not perform optimally when the event occurs later and one or more people will be killed or injured. One way to partially solve this dilemma is to use crash data from other vehicles as discussed above. Another method is to create data using the data obtained from the staged crash tests and operating on the data using various mathematical techniques which permits the creation of data which is representative of crashes not run. One method of accomplishing this is to use velocity and crash scaling as described in detail in the above referenced papers and particularly in reference 1) page 8 and reference 2) pages 37–49. This is the second step in the process illustrated in FIG. 7.

The third step is to assume a candidate neural network architecture. A choice which is moderately complex is suggested such as one with 100 input nodes and 6 hidden layer nodes. If the network is too simple, there will be cases for which the system cannot be trained and, if these are important crashes, the network will have to be revised by adding more nodes. If the initial choice is too complex, this will usually show up after the training with one or more of the weights having a near zero value. In any event, the network will be tested later by removing one node at a time to see if the accuracy of the network degrades. Naturally, a similar set of steps apply to other pattern recognition technologies.

The training data must now be organized in a fashion similar to the way it will be seen on a vehicle. Although data from a previously staged crash is available for the full time period of the crash, the vehicle mounted system will only see the data one value at a time. Thus, the training data must be fed to the pattern recognition computer, or computer program, in that manner. This is accomplished by taking each crash data file and creating 100 cases from it, assuming that the time period chosen for a crash is 200 milliseconds and that each data point is the average acceleration over two milliseconds. The first training case contains the first data point and the remaining 99 points are zero, or random small values. The second data case contains the first two data points with the remaining 98 points set to zero or random low values etc. For the tenth data file, data point one will contain the average acceleration at twenty milliseconds into the crash, data point two the average acceleration at eighteen milliseconds into the crash, and data point ten will contain the data from the first two milliseconds of the crash. This process is continued until the one hundred data cases are created for the crash. Each case is represented as a line of data in the training file. This same process must be done for each of the crashes and non-crash events for which there is data. A typical training set will finally contain on the order of 50,000 data cases.

This training set will now be trimmed substantially to exclude all those cases for which there is no definite requirement to deploy the restraint. For a particular 30 mph frontal barrier crash, for example, analysis of the crash has determined that the sensor must trigger the deployment of the airbag by 20 milliseconds. It is therefore not necessary to use data from that crash at less than 20 milliseconds since we are indifferent as to whether the sensor should trigger or not. Also, data greater than 20 milliseconds is of little value since that would represent a late deployment. For cases where the airbag should not trigger, on the other hand, the entire data set of 200 data files must be used. Finally, the training set must be balanced so that there are about as many no trigger cases as trigger cases so that the output will not be biased toward one or other decision. This then is the fourth step in the process as depicted in FIG. 7.

In the fifth step, the pattern recognition program is run with the training set. The program, if it is a neural network program, uses a variety of techniques such as the "back propagation" technique to assign weights to the connections from the input layer nodes to the hidden layer nodes and from the hidden layer nodes to the output layer nodes to try to minimize the error at the output node between the value calculated and the value desired. For example, for a particular crash such as a 30 mph frontal barrier impact, an analysis of the crash has yielded the fact that the sensor must trigger in 20 milliseconds and the data file representing the first 20 milliseconds of the crash would have a desired output node value of one. For another crash such as an 8 mph barrier crash where airbag deployment is not desired, the desired output value for all of the data lines which are used to represent this crash (100 lines) would have associated with them a desired output node value of 0. The network program then assigns different weights to the nodes until all of the airbag-not-desired cases have an output node value nearly equal to 0 and similarly all of the airbag-desired cases have an output value close to 1. The program finds those weights which minimize the error between the desired output values and the calculated output values.

The term weight is a general term in the art used to describe the mathematical operation which is performed on each datum at each node at one layer before it is inputted into a node at a higher layer. The data at input layer node 1, for example, will be operated on by a function which contains at least one factor which is determined by the training process. In general this factor, or weight, is different for each combination of an input node and hidden layer node. Thus, in the example above where there were 100 input nodes, 12 hidden layer nodes and 1 output node, there will in general be 1,212 weights which are determined by the neural network program during the training period. An example of a function used to operate on the data from one node before it is input to a higher level node is the sigmoid function:

In the usual back propagation trained network, let $O_{ij}$ be the output of node j in layer i, then the input to node k in layer i+1 is $$I_{i+1,k} = \Sigma_j W_{kj}^{(i)} O_{ij}$$

where $W_{kj}^{(i)}$ is the weight applied to the connection between node j in layer i and node k in layer i+1.

Then the output of node k in layer i+1 is found by transforming its input, for example, with the sigmoid function:

$$O_{i+1,k} = 1/(1+e^{-I_{i+1,k}})$$

and this is used in the input to the next, i+2, layer.

If the neural network is sufficiently complex, that is if it has many hidden layer nodes, and if the training set is small, the network may "memorize" the training set with the result that it can fail to respond properly on a slightly different case from those presented. This is one of the problems associated with neural networks which is now being solved by more advanced pattern recognition systems. The goal is to have a network which generalizes from the data presented and therefore will respond properly to a new case which is similar to but different from one of the cases presented. The network can also effectively memorize the input data if many cases are nearly the same. It is sometimes difficult to determine this by looking at the network so it is important that the network not be trained on all available data but that some significant representative sample of the data be held out of the training set to be used to test the network. This is the function of step five, to test the network using data that it has not seen before.

Step six involves redesigning the network and then repeating steps three through five until the results are satisfactory. This step is automatically accomplished by some of the neural network software products available on the market.

The final step is to output the computer code for the algorithm and to program a microprocessor with this code, see the example of such code above. One important feature of this invention is that the neural network system chosen is very simple and yet, because of the way that the data is fed to the network, all relevant calculations are made with a single network. There is no need, for example, to use an additional network to predict the time to trigger since that is already built into the training. Naturally, a significant improvement results when the actual position of the occupant is available as discussed above and, in fact, it is quite likely that the two systems will be introduced at the same time which will therefore combine the best single point crash sensor algorithm with the solution for the out-of-position occupant.

The steps described above and illustrated in FIG. 7 are for the case where a neural computer program is used to generate code which will be then used to program a standard microprocessor. Similar steps apply also to the case where a neural computer is used.

Figure 8:
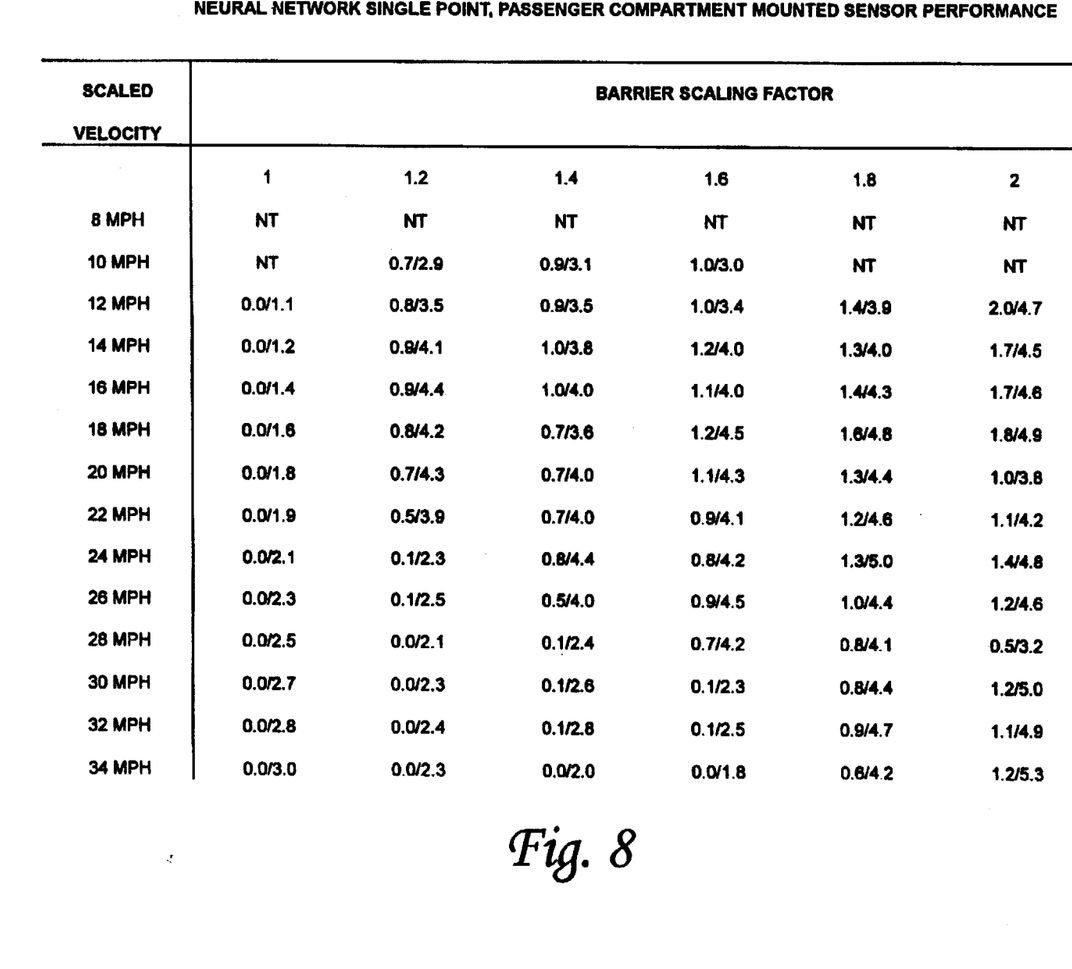
FIG. 8 contains the results of a neural network algorithm on a crash matrix created using the techniques of velocity and crash scaling.
Figure 9:
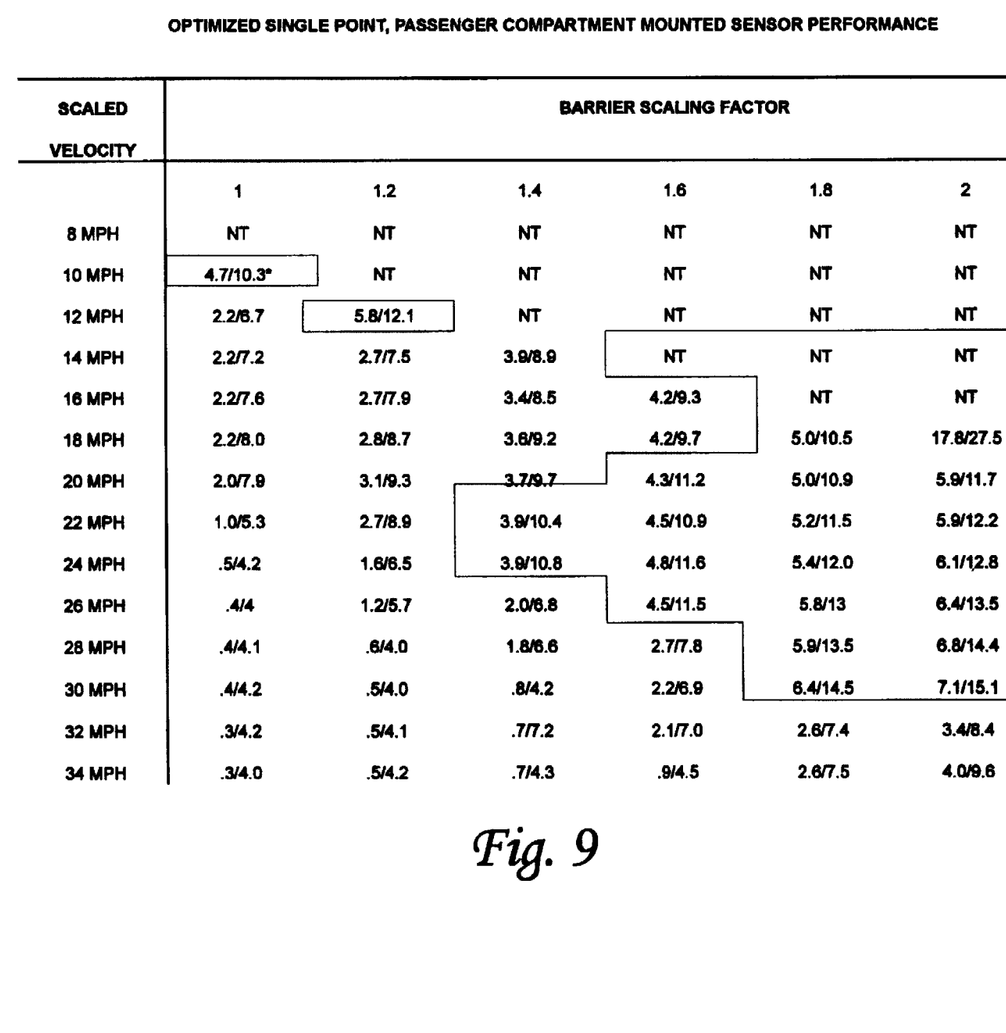
FIG. 9 contains the results of a standard single point crash sensor on a crash matrix created using the techniques of velocity and crash scaling.

In FIG. 8, the results of a neural network pattern recognition algorithm, designed in accordance with the teachings of this invention, for use as a single point crash sensor are presented for a matrix of crashes created according to the velocity and crash scaling techniques presented in the above referenced papers. The table contains the results for different impact velocities (vertical column) and different crash durations (horizontal row). The results presented for each combination of impact velocity and crash duration consist of the displacement of an unrestrained occupant at the time that airbag deployment is initiated and 30 milliseconds later.

Airbags are typically designed based on the assumption that 30 milliseconds of deployment time is available before the occupant, as represented by a dummy corresponding to the average male, has moved five inches. An occupant can be seriously injured or even killed by the deployment of the airbag if he or she is too close to the airbag when it deploys. It is known that this is particularly serious when the occupant is against the airbag when it deploys which corresponds to about 12 inches of motion for the average male occupant, and it is also known that he or she will be uninjured by the deploying airbag when the occupant has moved less than 5 inches when the airbag is completely deployed. These dimensions are based on the dummy which represents the average male, the so-called 50% male dummy, sitting in the mid-seating position. The threshold for significant injury is thus somewhere in between these two points and thus for the purposes of this table, two benchmarks have been selected as being approximations to the threshold of significant injury. These benchmarks are, based on the motion of an unrestrained occupant, (i) if the occupant has already moved 5 inches at the time that deployment in initiated, and (ii) if the occupant has moved 12 inches by the time that the airbag is fully deployed. Both benchmarks really mean that the occupant will be significantly interacting with the airbag as it is deploying. Other benchmarks could of course be used, however, it is believed that these are reasonable lacking a significant number of test results to demonstrate otherwise.

The tables shown in FIGS. 8 and 9, therefore, provide data as to the displacement of the occupant relative to the airbag at the time that deployment is initiated and 30 milliseconds later. If the first number is greater than 5 inches or the second number greater than 12 inches, it is assumed that there is a risk of significant injury and thus the sensor has failed to trigger the airbag in time. For these cases, the cell in the table has been shaded. As can be seen in FIG. 8, which represents the neural network crash sensor designed according to the teachings of this invention, none of the cells are shaded so the performance of the sensor is considered good.

The table shown in FIG. 9 represents a model of a single point crash sensor used on several production vehicle models in use today. In fact it was designed to be optimized for the crashes shown in the table. As shown in FIG. 9, the sensor fails to provide timely airbag deployment in a significant percentage of the crashes represented in the table.

One additional feature, which results from the use of the neural network crash sensor of this invention, is that at the time the decision is made to deploy the airbag, in the above example, 200 milliseconds of crash data is stored in the network input nodes. This provides a sort of "black box" which can be used later to accurately determine the severity of the crash.

Although several preferred embodiments are illustrated and described above, there are possible combinations using other geometries, materials and different dimensions for the components and different forms of the neural network implementation that perform the same functions. Also, the neural network has been described as an example of one means of pattern recognition, other pattern recognition means exist and still others are under development and will be available soon, which can be used to identify crashes requiring the deployment of an occupant restraint system which treat the individual data points discretely in determining if an identifiable pattern exists. Also, with the neural network system described above, the input data to the network may be data which has been pre-processed rather than the raw acceleration data either through a process called "feature extraction", as described in Green U.S. Pat. No. 4,906,940 for example, or by integrating the data and inputting the velocity data to the system, for example. This invention is not limited to the above embodiments and should be determined by the following claims.

What is claimed is:

1. In a motor vehicle having a deployable occupant protection apparatus for protecting at least one occupant of said vehicle in a crash, a sensor system for initiating deployment of said occupant protection apparatus comprising:
  (a) sensor means for sensing accelerations of said vehicle and producing an analog signal representative thereof,
  (b) mounting means for mounting said sensor means onto said vehicle;
  (c) converting means for receiving said analog signal and for converting said analog signal into a digital signal;
  (d) processing means receiving said digital signal and comprising pattern recognition means for determining if said digital signal contains a pattern characteristic of a vehicle crash requiring occupant protection, said processing means producing a deployment signal upon a determination by said pattern recognition means that said digital signal contains the pattern characteristic of a vehicle crash requiring occupant protection, said pattern recognition means comprising a single trained neural network such that the deployment signal is produced solely by the utilization of the single trained neural network; and
  (e) deployment initiation means coupled to said processing means and responsive to said deployment signal for initiating deployment of said occupant protection apparatus.

2. The sensor system in accordance with claim 1, wherein said converting means derive said digital signal from the integral of said analog signal.

3. The sensor system in accordance with claim 1, wherein said sensor means is mounted in a position on the vehicle to sense frontal impacts.

4. The sensor system in accordance with claim 1, further comprising means for detecting when said occupant to be protected by said deployable occupant protection apparatus is out-of-position and thereupon to suppress deployment of said occupant protection apparatus, wherein said detection means comprises said processing means.

5. The sensor system in accordance with claim 1, wherein said vehicle has a passenger seat and a passenger side airbag occupant protection apparatus and said sensor system further comprising detecting means for detecting the presence of a rear-facing child seat positioned on said passenger seat and thereupon to suppress deployment of said occupant protection apparatus, wherein said detection means comprises said processing means.

6. The sensor system in accordance with claim 1, wherein said sensor means comprises an anticipatory sensor.

7. The sensor system in accordance with claim 1, wherein said sensor means comprise a sensor for a collision avoidance system.

8. The sensor system in accordance with claim 1, wherein said sensor means is mounted in a position so as to sense rear impacts.

9. In a motor vehicle having a deployable occupant protection apparatus for protecting at least one occupant of said vehicle in a crash, a sensor for determining that said vehicle is experiencing a crash requiring deployment of said occupant protection apparatus comprising:
  (a) sensor means for sensing accelerations of said vehicle and producing an analog output signal representative thereof;
  (b) mounting means for mounting said sensor means onto said vehicle;
  (c) converting means for receiving said analog signal and for converting said analog signal into a digital signal;
  (d) a single neural computer coupled to said converting means for processing said digital signal, said single neural computer comprising pattern recognition means for determining if said digital signal contains a pattern characteristic of a vehicle crash requiring occupant protection, said neural computer producing a deployment signal when said pattern recognition means determines that said digital signal contains a pattern characteristic of a vehicle crash requiring occupant protection such that the deployment signal is produced solely by the utilization of said single neural computer; and (e) output means coupled to said neural computer responsive to said deployment signal for initiating deployment of said occupant protection apparatus.

10. The sensor in accordance with claim 9, wherein said occupant protection apparatus is an airbag and said crash is a frontal impact.

11. The sensor in accordance with claim 9, wherein said occupant protection apparatus comprises a movable headrest and said crash is a rear impact.

12. The sensor in accordance with claim 9, further comprising detecting means for detecting when said occupant to be protected by said deployable occupant protection apparatus is out-of-position and thereupon to suppress deployment of said occupant t protection apparatus, wherein said detection means comprises said neural computer.

13. The sensor in accordance with claim 9, wherein said vehicle has a passenger seat and further comprises a passenger side airbag occupant restraint apparatus and detecting means for detecting the presence of a rear-facing child seat positioned on said passenger seat and thereupon to suppress deployment of said occupant restraint, wherein said detection means comprises said neural computer.

14. The sensor in accordance with claim 9, wherein said sensor means comprises an acceleration measurement system which measures accelerations in at least two directions.

15. The sensor in accordance with claim 9, wherein additional data is input to said neural computer and said pattern recognition means uses said additional data.

16. The sensor in accordance with claim 15, wherein said additional data comprises data from an anticipatory sensor.

17. The sensor in accordance with claim 15, wherein said additional data comprises data from a collision avoidance sensor.

18. The sensor in accordance with claim 9, wherein said neural computer diagnoses the apparatus readiness.

19. A method of obtaining a single neural network for use with a microprocessor-based crash sensor to determine if a deployable occupant protection device in a vehicle should be deployed, comprising the steps of:

(a) obtaining digital crash data representative of the vehicle for which the crash sensor is intended to be used, said crash data being obtained from deployment desired crashes, crashes in which deployment is not desired and other events, the combination of all such crashes and events constituting a crash library for said vehicle;

(b) designing a candidate pattern recognition algorithm;

(c) training said pattern recognition algorithm to categorize the events of said crash library into deployment-desired and deployment-not-desired categories using a pattern recognition computer program and said crash library until categorization errors are reduced to a minimum, resulting in a single trained neural network;

(d) testing said trained pattern recognition algorithm using additional crashes and events representative of said vehicle;

(e) redesigning said trained pattern recognition algorithm if testing performance is unsatisfactory, and repeating training and testing steps(c) and (d); and (f) outputting from the pattern recognition program the resulting single trained neural network.

20. A method for sensing a crash of a vehicle to determine if a deployable occupant protection device in the vehicle should be deployed, comprising the steps of:

(a) obtaining an acceleration signal from an accelerometer mounted on the vehicle;

(b) converting said acceleration signal into digital time series data;

(c) entering said digital time series data into a first series of input nodes of a neural network;

(d) performing a mathematical operation on said data from each of said first series of input nodes and inputting said operated-on data into a second series of nodes wherein the operation performed on said data from each of said first series of input nodes prior to inputting the operated-on data to the second series of nodes is different from the operation performed on the data from the others of said first series of input nodes;

(e) combining the operated-on data from all of the input nodes in said first series of input nodes into each node in said second series of nodes to form a value at each node in said second series of nodes;

(f) performing a mathematical operation on each of said values on said nodes in said second series of nodes and inputting said operated-on data into an output series of nodes wherein the operation performed on the value on each of said nodes in said second series of nodes prior to inputting the operated-on value to said output series of nodes is different from that operation performed on the values on others of said nodes in said second series of nodes;

(g) combining the operated-on data from all of the nodes in said second series of nodes into each node of said output series of nodes to form a value at each node of said output series of nodes; and, (h) deploying the occupant protection device if the value on one node of said output series of nodes is within a range signifying that a crash requiring the deployment of the occupant protection device is underway.

21. The method in accordance with claim 20, wherein a third series of nodes is placed between said second series of nodes and said output series of nodes and said operated-on data from said second series of nodes is input into said third series of nodes, further comprising the steps of performing a mathematical operation on each of said values on said nodes in said third series of nodes and inputting the operated on values from said third series of nodes into said nodes in said output series of nodes.

22. In a motor vehicle having a deployable occupant protection apparatus for protecting at least two occupants of said vehicle in a crash, said vehicle having a driver's seat occupiable by a driver and a front passenger seat containing an object, a sensor system for initiating deployment of said occupant protection apparatus comprising:

(a) first sensor means for sensing accelerations of said vehicle and producing an analog output signal representative thereof;

(b) second sensor means for sensing the position of the driver relative to said deployable occupant protection apparatus;

(c) identification means for identifying the object occupying said front passenger seat;

(d) mounting means for mounting said first sensor means onto said vehicle;

(e) converting means coupled to said first sensor means for receiving said analog signal and for converting said analog signal into a digital signal;

(f) processing means coupled to said convening means, said second sensor means and said identification means and comprising pattern recognition means for determining if said digital signal contains a pattern characteristic of a vehicle crash requiring occupant protection, said processing means producing a deployment signal when (i) said pattern recognition means determines that said digital signal contains a pattern characteristic of a vehicle crash requiring occupant protection, (ii) said second sensor means indicates that the driver is at least a predetermined displacement from said deployable restraint, and (iii) said identification means determines that said passenger seat is occupied and that it is not occupied by a rear facing child seat; and, (g) deployment initiation means coupled to said processing means and responsive to said deployment signal to initiate deployment signal to initiate deployment of said occupant protection apparatus.

23. The system in accordance with claim 22, wherein said pattern recognition means comprises a neural network.

24. In a motor vehicle having a deployable occupant protection apparatus for protecting at least one occupant of the vehicle in a crash, a sensor for determining that the vehicle is experiencing a crash requiring deployment of the occupant protection apparatus comprising:

(a) sensor means mounted on the vehicle for sensing accelerations of the vehicle and producing an analog output signal representative thereof;

(b) converting means coupled to said sensor means for receiving said analog signal and for converting said analog signal into a digital signal;

(c) a neural computer coupled to said converting means for processing said digital signal, said neural computer comprising pattern recognition means for determining that said digital signal contains a pattern characteristic of a vehicle crash requiring occupant protection and producing a deployment signal upon a determination by said pattern recognition means that said digital signal contains the pattern characteristic of a vehicle crash requiring occupant protection, said neural computer being coupled to the occupant protection apparatus and structured and arranged to diagnose the readiness of deployment of the occupant protection apparatus; and (d) output means coupled to said neural computer for responding to said deployment signal and initiating deployment of the occupant protection apparatus.

* * * * *